Oct. 15, 1935.  S. G. DOWN  2,017,688
BRAKE CYLINDER MOUNTING
Filed Jan. 28, 1932  3 Sheets-Sheet 1
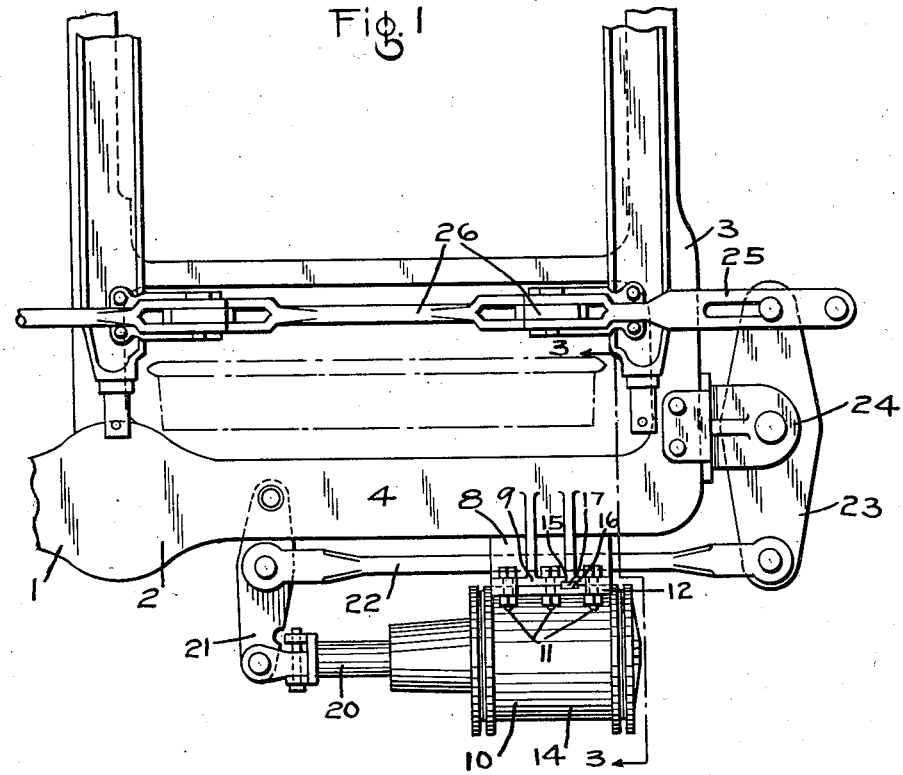
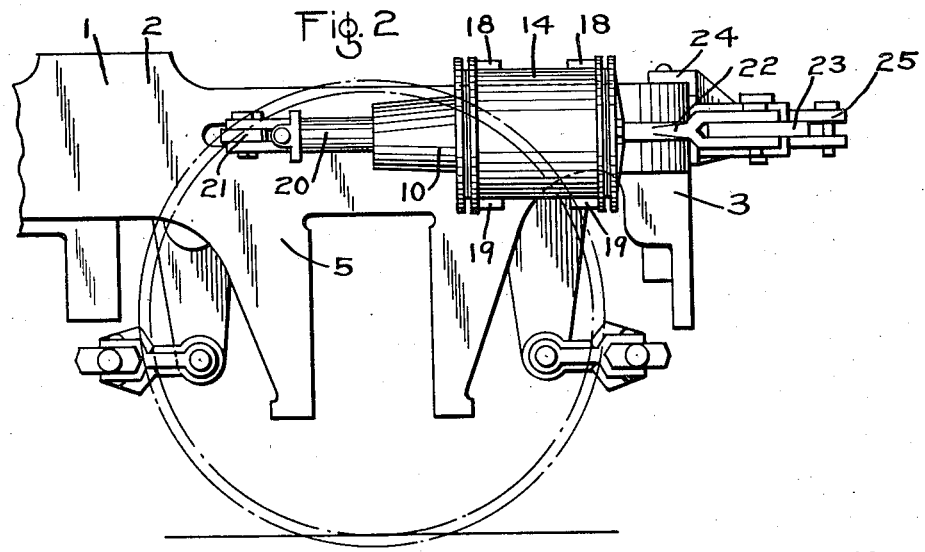
INVENTOR.
SIDNEY G. DOWN
By  Wm. M. Cady
ATTORNEY.

Oct. 15, 1935.  S. G. DOWN  2,017,688
BRAKE CYLINDER MOUNTING
Filed Jan. 28, 1932  3 Sheets-Sheet 2
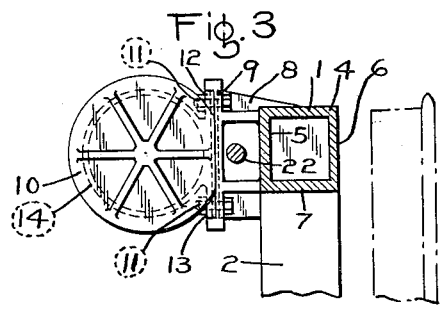
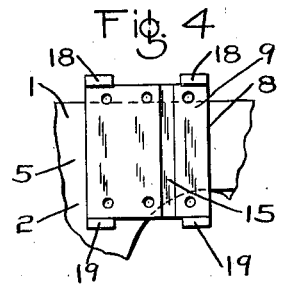
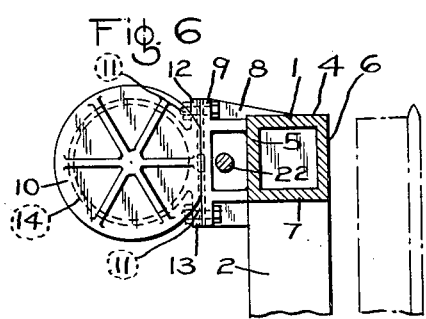
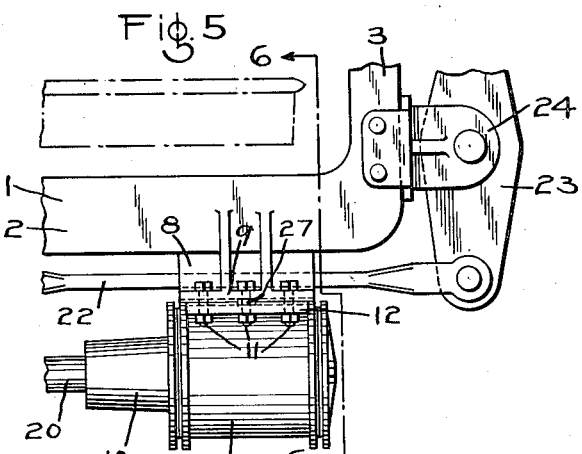
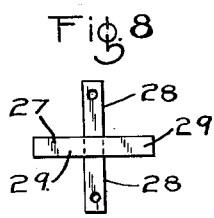
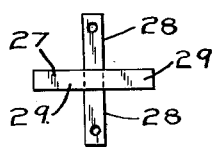
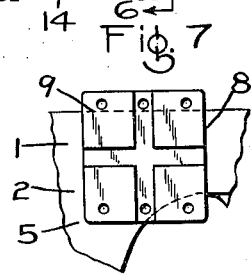
INVENTOR.
SIDNEY G. DOWN
By  Wm. M. Cady
ATTORNEY.

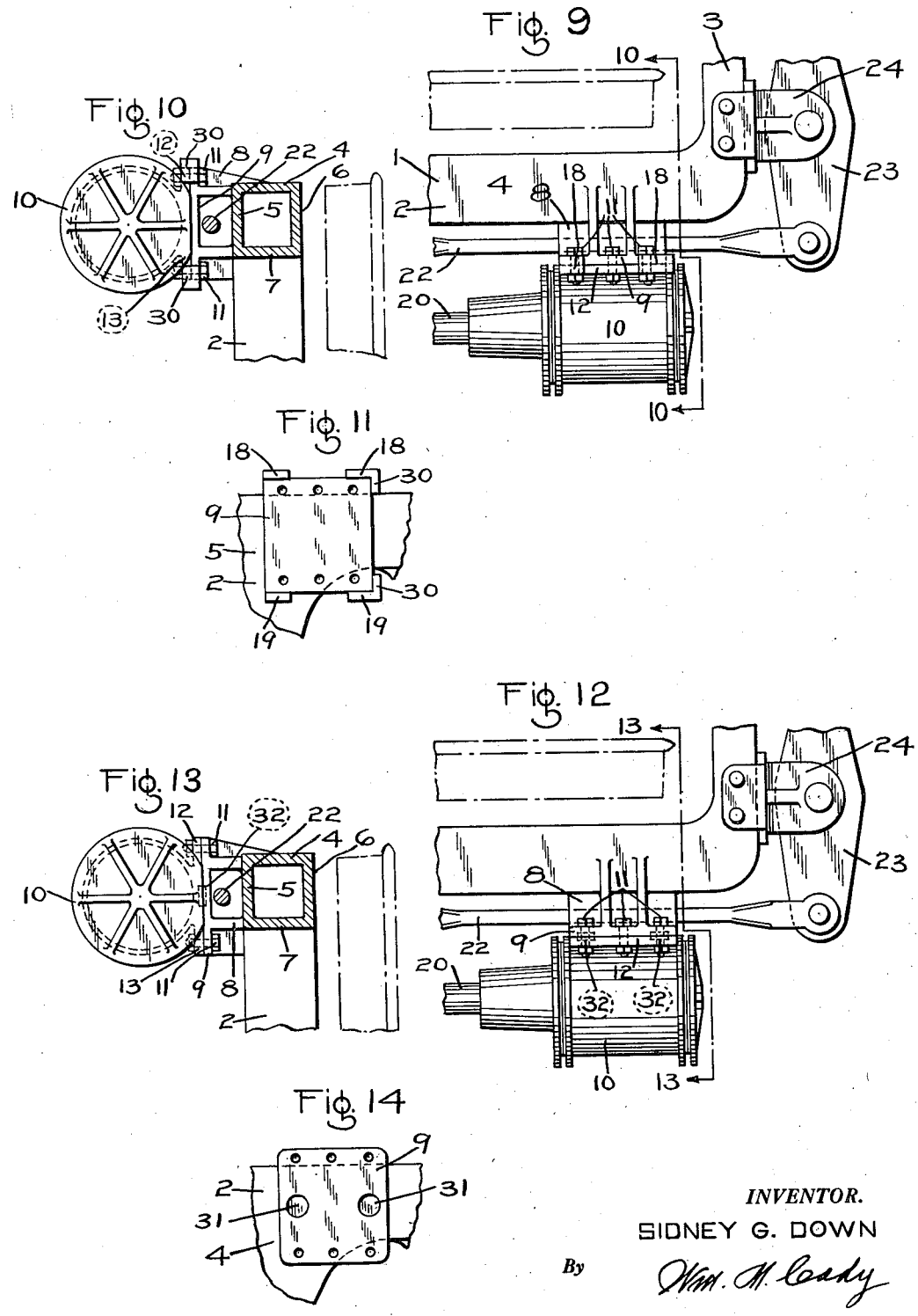

Patented Oct. 15, 1935

2,017,688

UNITED STATES PATENT OFFICE 2,017,688

BRAKE CYLINDER MOUNTING

Sidney G. Down, Edgewood, Pa., assignor to The Westinghouse Air Brake Company, Wilmerding, Pa., a corporation of Pennsylvania Application January 28, 1932, Serial No. 589,435

1 Claim. (Cl. 188—205)

This invention relates to brake rigging for railway car trucks, and more particularly to that type of rigging comprising a brake cylinder device which is mounted on the truck frame, and which, through the medium of a suitable system of connected levers and rods, is adapted to operate the usual brake shoes to effect an application and the release of the brakes.

Heretofore, in brake rigging of the above type, it has been proposed to secure the brake cylinder device to a fixed part of the truck frame by the use of bolts, in such manner that when the brake cylinder device operates to effect an application of the brakes, the end thrust of the device is taken by the securing bolts. This causes the securing bolts to be subjected to severe shearing stresses, which tend to damage the bolts or otherwise destroy the rigid connection between the truck frame and the brake cylinder device.

The principal object of my invention is to provide a brake cylinder mounting in which the securing bolts thereof cannot be subjected to shearing stresses due to the end thrust of the brake cylinder device.

According to my invention I attain this object by providing means separate from the securing bolts, whereby the brake cylinder device is interlocked with the truck frame against longitudinal movement, when the brake cylinder device is secured to the truck frame by the bolts.

A brake cylinder device mounted on a truck frame is adapted to be subjected to more severe and destructive vibration than when mounted on the underframe of the car body in the usual well known manner. Due to clearance conditions between a car body and the truck it is desirable to secure the brake cylinder device to a vertically disposed web or flange of either a side or end member of the truck frame. In the constructions heretofore proposed, the brake cylinder device is secured to either of the frame members above mentioned and the securing bolts constitute the only support for the brake cylinder device. This is objectionable for the reason that the vibrations set up will tend to loosen the rigid connection between the truck frame and brake cylinder device.

Another object of my invention is to provide a brake cylinder mounting in which the securing bolts are not only maintained free from shearing stresses due to the possible end thrust of the brake cylinder device in effecting an application of the brakes, but are also relieved of the weight of the brake cylinder device, and relative vertical movement between the truck frame and brake cylinder device is prevented by means separate from the securing bolts.

The feature of relieving the securing bolts of the weight of the brake cylinder device and of maintaining the brake cylinder device against vertical movement relative to the truck frame, I accomplish by interlocking the truck frame and brake cylinder device together in the manner hereinafter more fully described.

Other objects and advantages will appear in the following more detailed description of my invention.

In the accompanying drawings, Fig. 1 is a plan view of a portion of a car truck and brake rigging embodying my improved brake cylinder mounting; Fig. 2 is a side elevational view of the same; Fig. 3 is a fragmentary cross sectional view taken on the line 3—3 of Fig. 1; and Fig. 4 is a side elevational view of a portion of the truck frame with the brake cylinder device removed. Fig. 5 is a plan view of a portion of a car truck and brake rigging embodying another form of my invention; Fig. 6 is a fragmentary cross sectional view of the same taken on the line 6—6 of Fig. 5; Fig. 7 is a side elevational view of a portion of the truck frame with the brake cylinder device removed; Fig. 8 is a detail view of parts of this form of brake cylinder mounting; Fig. 9 is a plan view of a portion of a car truck and brake rigging embodying another form of my invention; Fig. 10 is a cross sectional view of the same taken on the line 10—10 of Fig. 9; and Fig. 11 is a fragmentary side elevational view of a portion of the truck frame with the brake cylinder device removed. Fig. 12 is a plan view of a portion of a car truck and brake rigging embodying a further form of my invention; Fig. 13 is a cross sectional view of the same taken on the line 13—13 of Fig. 12; and Fig. 14 is a fragmentary side elevational view of a portion of the truck frame with the brake cylinder device removed.

The truck frame may be of any desired construction, and as shown, is of the usual cast metal type having longitudinally extending parallel spaced side members 2, which are integrally connected by end members 3, only one of each of said side and end members being shown.

The side member 2 may be of any desired form in cross section, and, as shown, may comprise a horizontally disposed web 4 and vertically disposed outer and inner webs or flanges 5 and 6, respectively, which are integral with the web 4. At intervals throughout the length of the side member the webs 5 and 6 may be integrally connected by webs 7.

This side member is provided with an integral support or bracket 8, which extends outwardly from the web 5, and at its outer end terminates in a vertically disposed clamping plate 9, to which a brake cylinder device 10 is secured by bolts 11, which pass through holes provided in the clamping plate and vertically disposed top and bottom flanges 12 and 13, respectively, of the body portion 14 of the brake cylinder device.

The clamping face of the clamping plate 9 is provided with a groove 15 which extends across the plate in the direction of its vertical width, which groove for its full length is open to a corresponding groove 16 provided in the body portion 14 of the brake cylinder device. When the brake cylinder device is secured to the clamping plate 9, the grooves 15 and 16 provide a rectangular opening between the clamping plate and the body portion of the brake cylinder device, into which a correspondingly shaped key 17 may be inserted. The key will have a tight fit with the clamping plate and with the body portion of the brake cylinder device, so that when the brake cylinder device is secured in place by the bolts 11 it will take the end thrust of the brake cylinder device and thus prevent the bolts from being subjected to shearing stresses due to such end thrust. Since the key 17 has a tight fit with the clamping plate 9 and the body portion of the brake cylinder device, there is no danger of it becoming jarred loose and lost. However, if desired, the key may be provided with a head for engagement with the upper edges of the clamping plate 9 and brake cylinder flange 12.

The clamping plate, at its upper corners, is provided with outwardly extending lugs 18 which overlap and engage the upper edge of the brake cylinder flange 12, and at its lower corners is provided with outwardly extending lugs 19 upon which the lower edge of the brake cylinder flange 13 rests.

It will here be noted that the lugs 19 are adapted to relieve the securing bolts of the weight of the brake cylinder device and prevent downward movement of the brake cylinder device relative to the truck frame, and that the lugs 18 prevent upward movement of the brake cylinder device, and further that the key 17 securely holds the brake cylinder device against longitudinal movement relative to the truck frame.

The brake cylinder device is provided with the usual push rod 20, which, at its outer end, is operatively connected to any desired system of brake levers and rods. In the present embodiment of the invention the outer end of the push rod 20 is shown connected to the outer end of a lever 21 having, at its inner end, a pivotal connection with the truck frame. Intermediate its ends this lever 21 is operatively connected, through the medium of a pull rod 22, which the outer end of a lever 23 which is pivotally mounted in a bracket 24 secured to the end member of the truck frame, the inner end of the lever 23 being operatively connected, through the medium of a pull rod 25, with the end lever of a system 26 of connected brake levers and rods.

In Figs. 5 to 8, inclusive, another form of the brake cylinder mounting is illustrated in which a cruciform member 27 is provided, which fits in correspondingly shaped grooves formed in the clamping plate 9 and the body portion of the brake cylinder device, and interlocks the truck frame and brake cylinder device together when the brake cylinder device is secured in place by the securing bolts 11. The arms 28 of the member 27 are vertically disposed and are adapted to take the end thrust of the brake cylinder device, and the arms 29 are disposed at right angles to the arms 28 and relieve the securing bolts 11 of the weight of the brake cylinder device and also serve to hold the brake cylinder device against vertical movement relative to the truck frame. In this construction, the lugs 18 and 19 shown in Figs. 1 to 4, inclusive, are omitted since the arms 29 of the member 27 perform the same functions as the lugs.

In Figs. 9, 10 and 11, another form of the brake cylinder mounting is illustrated, in which the clamping plate besides having lugs 18 and 19 also has end lugs 30, which the rear ends of the brake cylinder flanges 12 and 13 engage to prevent shearing stresses from being imposed on the securing bolts, and serve the same purpose as the interlocking key 17 of the form of the invention shown in Figs. 1 to 4, inclusive.

In Figs. 12, 13 and 14, a further form of the brake cylinder mounting is illustrated, in which the clamping face of the plate 9 and the corresponding clamping face of the body portion of the brake cylinder device are provided with sockets 31, which are adapted to receive disks 32, which, when the brake cylinder body portion is secured to the clamping plate 9, engage the clamping plate and body portion of the brake cylinder and interlock said body portion with the truck frame, so as to prevent the brake cylinder device from moving relative to the truck frame. It will be noted that in this form of my invention the disks 32 not only take the end thrust of the brake cylinder device, but also support the brake cylinder device so that the weight of the device is not imposed upon the securing bolts 11 and further prevent the brake cylinder device from moving vertically relative to the truck frame.

While several illustrative embodiments of the invention have been described in detail, it is not my intention to limit its scope to these embodiments or otherwise than by the terms of the appended claim.

Having now described my invention, what I claim as new and desire to secure by Letters Patent, is:

In a brake cylinder mounting, the combination with a truck frame, of a brake cylinder carried by said truck frame, means securing said brake cylinder to the truck frame, and a cruciform member interposed between and engaging with said truck frame and brake cylinder for preventing the securing means from being subjected to shearing action and for supporting the brake cylinder from the truck frame independently of the securing means.

SIDNEY G. DOWN.